Feb. 10, 1931. J. E. BOND 1,791,706
AGITATOR
Filed April 8, 1929 2 Sheets-Sheet 1

Witness
A.B.Davison.

Inventor
Joseph E. Bond
By Murray & Murray
Attys.

Feb. 10, 1931. J. E. BOND 1,791,706
AGITATOR
Filed April 8, 1929 2 Sheets-Sheet 2
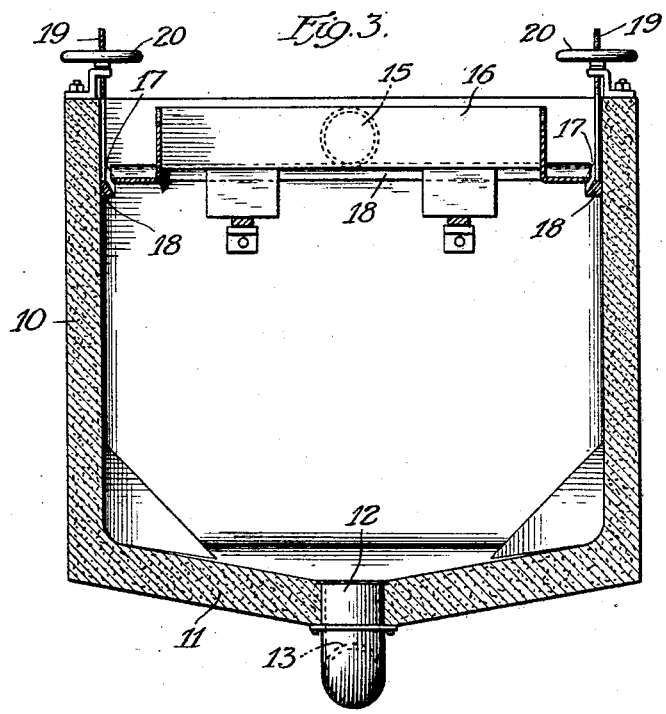
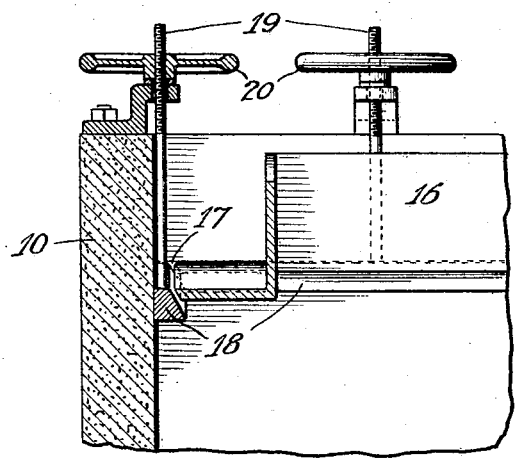
Witness
R. B. Davison
Inventor
Joseph E. Bond
By Murray & Murray
Attys.

UNITED STATES PATENT OFFICE

JOSEPH E. BOND, OF APPLETON, WISCONSIN

AGITATOR

Application filed April 8, 1929. Serial No. 353,567.

My invention relates to the art of paper making and particularly to means for agitating paper pulp.

In the storage and handling of pulp in large quantities, means must be provided for maintaining the semi-liquid mass at proper consistency and this has been found to be difficult due to the character of the material and its tendency toward stratification, settling of the solids and coherence of the solids into masses.

In the improvement here disclosed, the pulp is passed through a screw pump, the rotor of which breaks up any masses of solids, and delivered into a trough extending around the inside of a tank at the top. A continuous narrow slit is provided in the bottom wall of the trough, through which the material again enters the tank. By withdrawing the material from the bottom at the center, a thorough agitation is effected at a minimum expenditure of power.

The invention will be more readily understood by reference to the accompanying drawings, in which Fig. 1 is a plan view of apparatus constructed in accordance with my invention;

Fig. 3 is a transverse vertical sectional view on the line 3—3 of Fig. 1; and

Fig. 4 is an enlarged fragmentary sectional view showing the means for varying the size of the discharge outlet from the trough.

Figure 1:
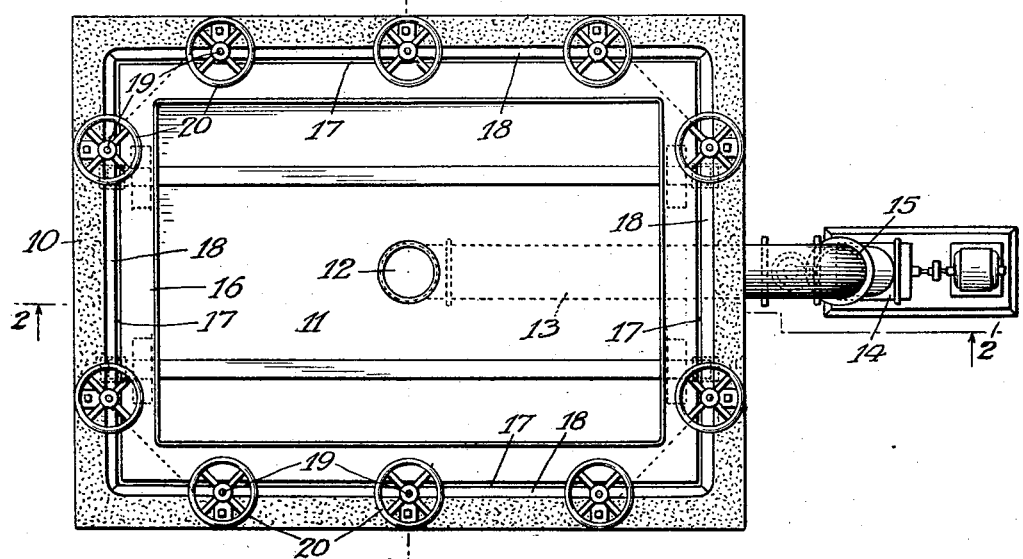
Figure 2:
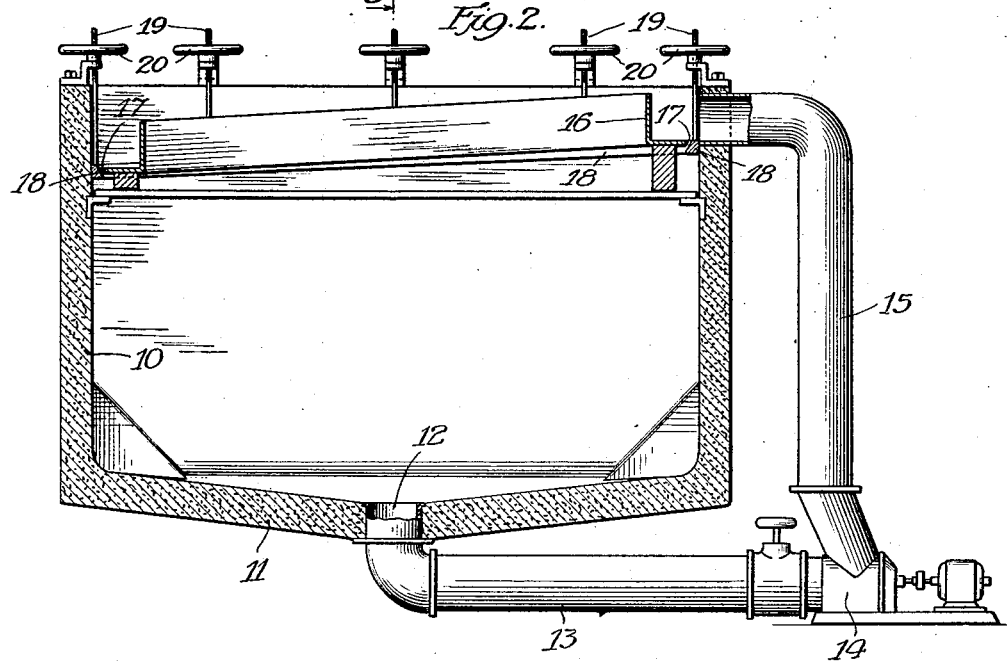
Fig. 2 is a longitudinal vertical sectional view on the line 2—2 of Fig. 1.

In the drawings I have shown a tank having side walls 10 and bottom wall 11, the latter sloping toward a center outlet 12, a pipe 13 is connected to the outlet and to the intake of a screw pump 14. The discharge outlet from the pump is connected to a pipe 15 which empties into a trough 16 located inside the tank at the top thereof and mounted on the walls 10. Preferably, the trough slopes downwardly from the front to the back. At the lower inside corner of the trough or conduit I provide a continuous discharge part 17, the size of which is controlled by a wedge shaped valve member 18 of substantial length. The shape of the wedge member is such that the material is discharged toward the center of the tank. Regulation of the size of the opening is effected by the screw 19 controlled by the hand wheel 20. A sufficient number of the regulating devices will be provided to enable accurate control and an even discharge throughout the entire length of the trough.

The described apparatus is very simple and economically constructed and will be found to be highly efficient in operation.

I claim:

1. In an agitator, the combination of a tank, a pump having an inlet communicating with the bottom of the tank, a trough at the top of the tank near the side thereof, and having a substantially continuous discharge outlet in its bottom and an outlet pipe from the pump discharging into said trough.

2. In an agitator, the combination of a tank, a pump having an inlet communicating with the bottom of the tank at a point near the center thereof, a trough at the top of the tank near the side thereof and having a substantially continuous discharge outlet in its bottom and an outlet pipe from the pump discharging into said trough.

3. In combination, a tank, a pump connected to withdraw material from the bottom of the tank, a continuous trough located within the tank near the top and adjacent to the side walls and having a substantially continuous narrow outlet in its bottom, means for delivering material from the discharge of said pump to said trough, and means for adjusting the size of said narrow outlet.

In testimony whereof I have affixed my signature.

JOSEPH E. BOND.